(12) United States Patent
Futami et al.

(10) Patent No.: US 8,750,424 B2
(45) Date of Patent: Jun. 10, 2014

(54) SIGNAL RECEIVING APPARATUS, SIGNAL RECEIVING METHOD AND SIGNAL RECEIVING PROGRAM

(75) Inventors: Tetsuhiro Futami, Kanagawa (JP); Keita Izumi, Tokyo (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 13/205,781

(22) Filed: Aug. 9, 2011

(65) Prior Publication Data

US 2012/0063549 A1 Mar. 15, 2012

(30) Foreign Application Priority Data

Sep. 14, 2010 (JP) ................................. 2010-205427

(51) Int. Cl.
*H03D 3/00* (2006.01)
(52) U.S. Cl.
USPC ......................................................... 375/323
(58) Field of Classification Search
USPC ......................................................... 375/323
See application file for complete search history.

(56) References Cited

U.S. PATENT DOCUMENTS

| 2003/0223507 A1* | 12/2003 | De Gaudenzi et al. ....... 375/279 |
| 2006/0209982 A1 | 9/2006 | De Gaudenzi et al. |
| 2009/0208224 A1* | 8/2009 | Kikuchi ......................... 398/141 |

FOREIGN PATENT DOCUMENTS

EP 1 956 782 A1 8/2008

OTHER PUBLICATIONS

Sebesta, Jiri. ("Efficient method for APSK demodulation." In Proc. 3rd International Conference on Applied Mathematics, Simulation, Modelling, Circuits, Systems and Signals, pp. 187-190. 2009).*
"Transmission System for Advanced Wide Band Digital Satellite Broadcasting", Association of Radio Industries and Businesses, ARIB STD-B44 1.0, http://www.arib.or.jp/tyosakenkyu/kikaku_hoso/hoso_std-b044.html, Jul. 29, 2009, 119 pages.
Extended European Search Report issued May 23, 2012 in Patent Application No. 11178624.0.
Nobuhiko Kikuchi et al., "Incoherent 32-Level Optical Multilevel Signaling Technologies", Journal of Lightwave Technology, vol. 26, No. 1, XP011204214, Jan. 1, 2008, pp. 150-157.
Yoichi Suzuki et al., "A Study of Adaptive Equalizer for APSK in the Advanced Satellite Broadcasting System", Global Telecommunications Conference, XP031646039, Nov. 30, 2009, pp. 1-6.
Xiang Liu et al., "Generalized Data-aided Multi-symbol Phase Estimation for Improving Receiver Sensitivity in Direct-detection Optical m-ary DPSK", Optics Express, vol. 15, No. 6, XP009101654, Mar. 1, 2007, pp. 2927-2939.

* cited by examiner

*Primary Examiner* — Jaison Joseph
(74) *Attorney, Agent, or Firm* — Sony Corporation of America

(57) ABSTRACT

A signal receiving apparatus has: a radius identifying section configured to identify a radius representing a distance from an origin on an IQ plane of signal points each corresponding to a symbol obtained from a received signal modulated by adoption of an APSK modulation method; and a parameter outputting section configured to output a control parameter related to a demodulation or decoding process of the received signal on the basis of the identified radius.

11 Claims, 10 Drawing Sheets

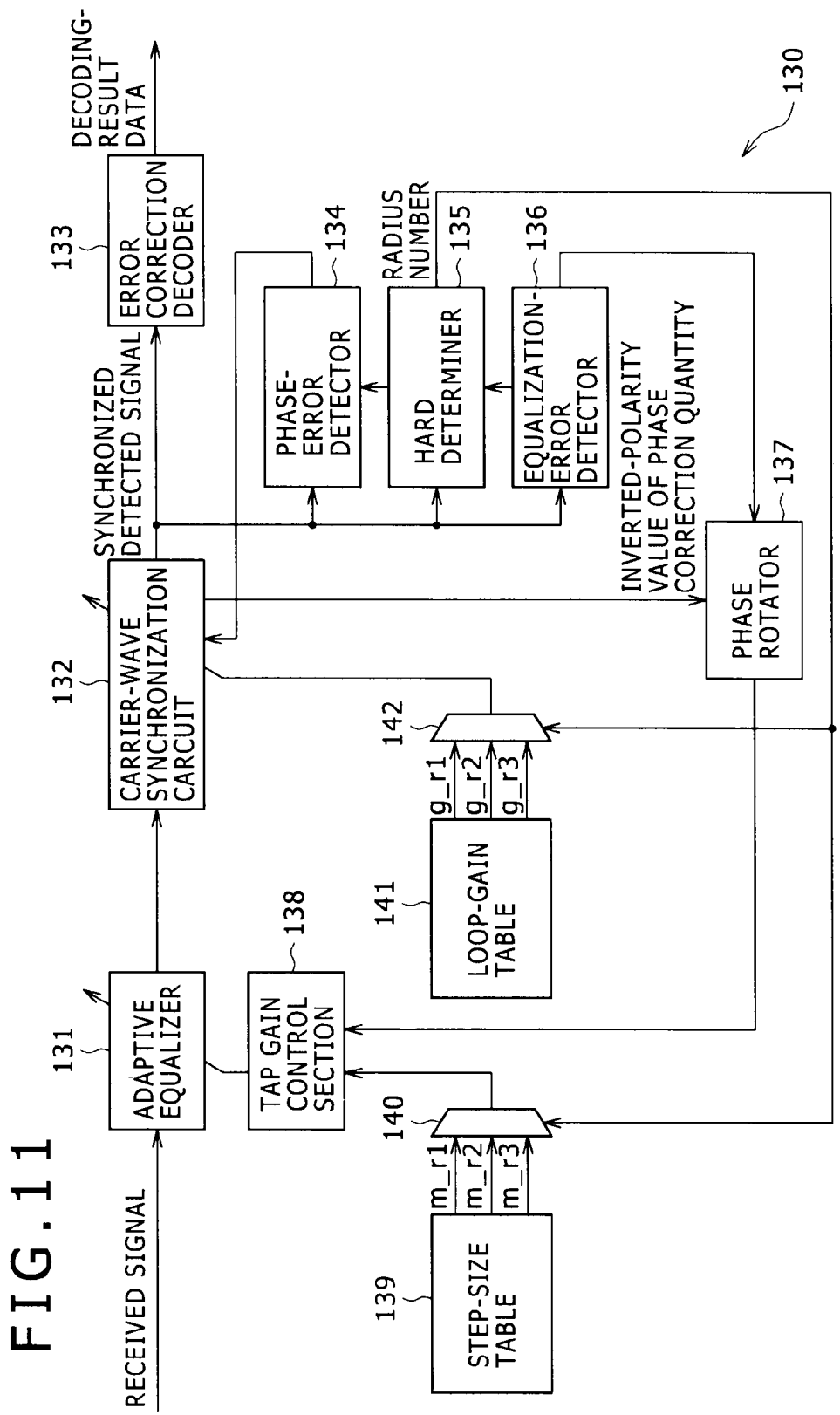

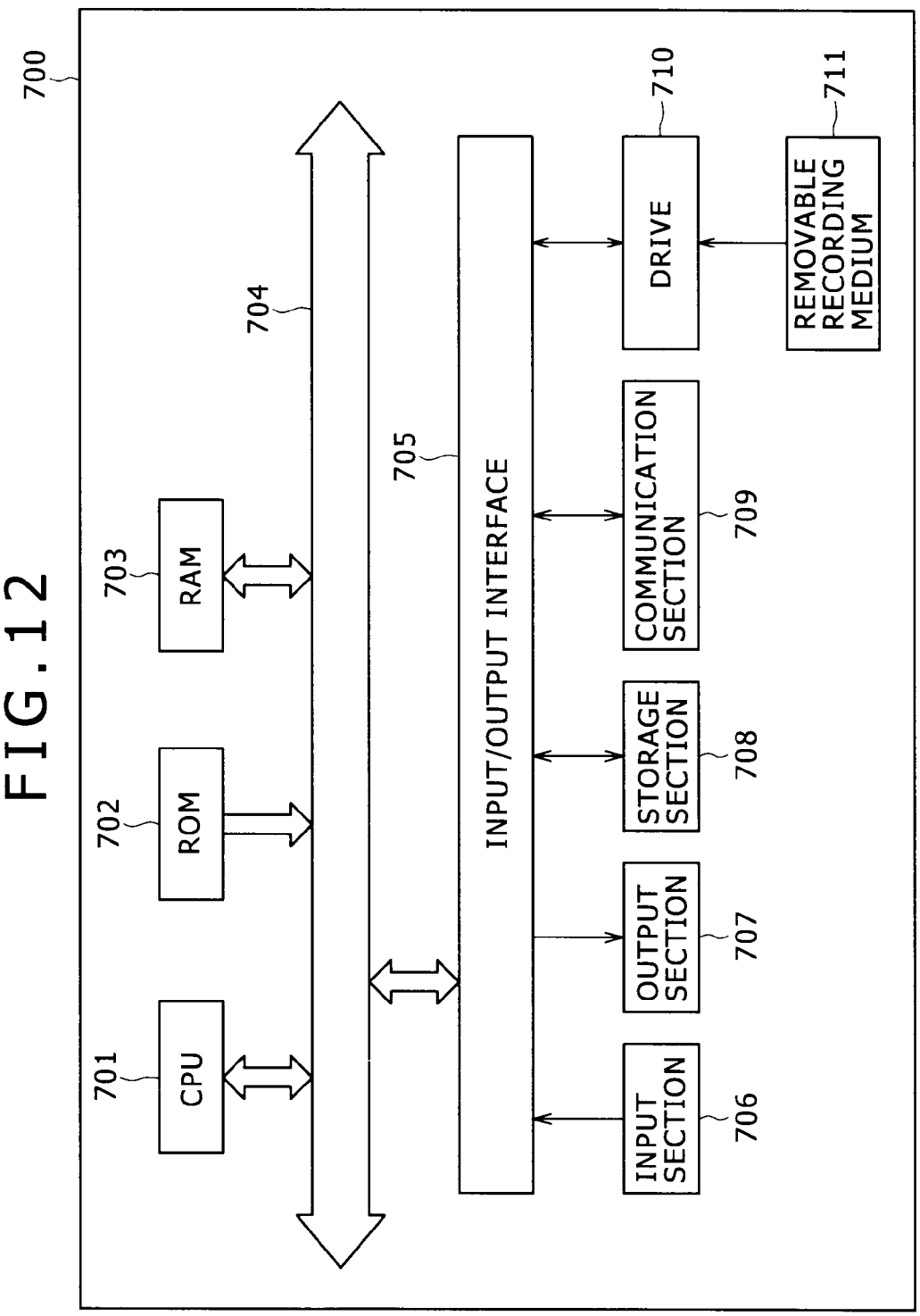

SIGNAL RECEIVING APPARATUS, SIGNAL RECEIVING METHOD AND SIGNAL RECEIVING PROGRAM

BACKGROUND

The present disclosure relates to a signal receiving apparatus, a signal receiving method and a signal receiving program. More particularly, the present disclosure relates to a signal receiving apparatus compensating a received signal for distortions caused by nonlinearities so as to be capable of demodulating or decoding the received signal in a simpler way and at a higher speed in a digital-data transmission based on APSK (Amplitude Phase Shift Keying) modulation. The present disclosure also relates to a signal receiving method provided for the signal receiving apparatus and a signal receiving program implementing the signal receiving method.

In recent years, as information transmitted in a radio digital-data transmission diversifies and the amount of the transmitted information increases, APSK modulation having a better frequency utilization efficiency than the existing PSK (Phase Shift Keying) modulation is introduced. Typical examples of the radio digital-data transmission are digital broadcasting, which can be satellite broadcasting or ground-wave broadcasting, hand-phone communications and communications through a radio LAN (Local Area Network). In the case of the APSK modulation, however, the dynamic range of amplitude variations increases in comparison with the PSK modulation. Thus, effects of transmission-line distortions generated due to nonlinearities of a signal transmitting amplifier and a signal receiving amplifier become more striking.

As one of technologies provided on the signal receiving apparatus side to serve as a technology for compensating a received signal for distortions caused by nonlinearities, there have been known a method for detecting a phase error in carrier-wave synchronization and a method for computing likelihood in error correction decoding by taking an average signal point found after compensation of a signal for distortions caused by nonlinearities as a reference as is disclosed in interpretation A of the ARIB STD-B44. For more information on such a technology, the reader is advised to refer to documents such as http://www.arib.or.jp/tyosakenkyu/kikaku-_hoso/hoso_std-b044.html.

The STD-B44 is a transmission standard of the advanced BS (broadband satellite) digital broadcasting. At the present day, the STD-B44 is the successor to the ARIB STD-B20 which is the BS digital broadcasting already put in service domestically. In the advanced BS digital broadcasting, a circular-type 16 APSK signal or a circular-type 32 APSK signal is newly adopted so as to implement a transmission at a capacity greater than the transmission according to the present standard. In addition, an LDPC (Low Density Parity Check) code is used as an error correction code in order to improve the transmission efficiency.

In the transmission format of the advanced BS digital broadcasting, for the purpose of compensating a received signal for distortions caused by nonlinearities for an APSK signal like ones mentioned above, a known series referred to as a transmitted signal point position signal is transmitted in a multiplexed way.

If 32 ASPK signal points of a transmitted signal are transmitted for example, in comparison with the originally expected transmitted signal point, the signal points of a received signal suffering from distortions caused by nonlinearities are distributed with a point of a shifted amplitude and/or a shifted phase serving as a distribution center. Thus, if hard determination and/or likelihood computation are carried out by taking the position of the originally expected transmitted signal point as an ideal signal point position, the performances of the carrier wave synchronization and/or the error correction decoding deteriorate considerably.

The transmitted signal point position signal cited above is transmitted by sequentially transmitting all signal points for the same modulation method as the transmitted main signal of the corresponding modulation slot in a known order. Thus, for every signal point, the signal receiving apparatus is capable of taking an average of the signals received during the corresponding period in order to obtain the position of the center point of a signal-point distribution suffering from distortions caused by nonlinearities. As a result, by carrying out the carrier wave synchronization and/or the error correction decoding by taking this position (which has been obtained in this way as the position of the center point of a signal-point distribution) as an ideal signal point, the received signal can be compensated for the distortions caused by nonlinearities.

The existing demodulation circuit applied to a signal receiving apparatus for the advanced BS digital broadcasting is configured as follows.

The existing demodulation circuit is configured to employ main sections including a carrier-wave synchronization circuit, a signal-point averaging circuit, a signal-point position table, a hard determiner, a phase-error detector, a likelihood computation section and an error correction decoder.

The carrier-wave synchronization circuit is configured as an ordinary digital PLL (Phase Locked Loop) circuit. The carrier-wave synchronization circuit carries out processing to synchronize the received signal to the frequency of the carrier waves and the phase of the waves so as to minimize the variances of a phase error detected by the phase-error detector.

For a synchronized detected signal output by the carrier-wave synchronization circuit, the signal-point averaging circuit computes an average of each of I and Q components of the transmitted signal point position signal for every signal point in order to generate signal point position information for all signal points.

The signal point position information generated by the signal-point averaging circuit is put in the signal-point position table serving as a table used for storing relations between signal-point coordinate positions on an IQ plane used for mapping an equal binary pattern and a multi-value binary pattern.

The hard determiner computes a boundary line on the IQ plane when hard determination is to be made on a signal point on the basis of the signal-point position table and carries out hard-determination processing based on the boundary line.

The phase-error detector finds a phase error between a hard-determination value output by the hard determiner and the synchronized detected signal in order to detect a phase error.

The likelihood computation section takes a signal-point position retrieved from the signal-point position table as an ideal signal point to compute an LLR (Log Likelihood Ratio) of each of bits composing the binary pattern mapped onto signal points.

The error correction decoder decodes LDPC codes on the basis of the LLRs, outputting decoding-result data.

Such a demodulation circuit is capable of carrying out carrier wave synchronization and error correction decoding to give rise to only fewer deteriorations even for a received signal with much shifted distributions of the amplitude of a signal point and the phase of the signal point due to distortions caused by nonlinearities.

SUMMARY

In the existing demodulation circuit, however, it is necessary to compute an average of received signals for every signal point. Thus, the number of APSK multi values increases and, the larger the number of signal points, the larger the number of aforementioned signal-point averaging circuits which are demanded. That is to say, the number of aforementioned signal-point averaging circuits which are demanded is proportional to the number of signal points. There is thus concern that the scale of the demodulation circuit increases.

In addition, the larger the number of signal points, the lower the frequency at which the signal points are transmitted. That is to say, the frequency at which signal points are transmitted is inversely proportional to the number of aforementioned signal points. Thus, there is raised a problem that the convergence time is long. The convergence time is defined as the time it takes to obtain sufficient results of compensation of a received signal for distortions caused by nonlinearities by computing an average of signal points.

It is thus an embodiment of the present disclosure addressing the problems described above to be capable of demodulating or decoding a received signal in a simpler way and at a higher speed in a digital transmission based on APSK modulation by compensating the received signal for distortions caused by nonlinearities.

In accordance with an embodiment of the present disclosure, there is provided a signal receiving apparatus having:
  a radius identifying section configured to identify a radius representing a distance from an origin on an IQ plane of signal points each corresponding to a symbol obtained from a received signal modulated by adoption of an APSK modulation method; and
  a parameter outputting section configured to output a control parameter related to a demodulation or decoding process of the received signal on the basis of the identified radius.

It is possible to provide a configuration in which the radius identifying section identifies the radius by outputting information representing the radius of a signal point of a zone including a modulated known symbol in a frame composing the received signal.

It is possible to provide a configuration in which the received signal is a broadcast signal of advanced broadband satellite digital broadcasting and the zone including a modulated known symbol is a zone including a modulated transmitted signal point position signal.

It is possible to provide a configuration in which the radius identifying section pre-stores a radius and a phase on an IQ plane for each of symbols of the modulated transmitted signal point position signal and outputs information used for identifying the radius of the symbol as well as the phase of the symbol in an order of the positions of the symbols of the modulated transmitted signal point position signal synchronously with the received signal.

It is possible to provide a configuration in which the signal receiving apparatus is further provided with a phase-component offset section configured to carry offset processing on the phase component of every signal point of the received signal and an averaging section configured to compute an average of each of I and Q components included in a plurality of signal points, which take the identified radius as a common radius and have phase components already subjected to the offset processing, for each radius. For the I and Q components included in a signal point as components each averaged by the averaging section, the parameter outputting section generates reference signal point position information to be used as a reference in determination of a symbol of the received signal and likelihood computation on the basis of the I and Q components of a signal point obtained by restoring the phase component already subjected to the offset processing to its original value and outputs the reference signal point position information as the control parameter.

In accordance with another embodiment of the present disclosure, there is provided a signal receiving method including:
  a radius identifying section carrying out to identify a radius representing a distance from an origin on an IQ plane of signal points each corresponding to a symbol obtained from a received signal modulated by adoption of an APSK modulation method; and
  a parameter outputting section carrying out to output a control parameter related to a demodulation or decoding process of the received signal on the basis of the identified radius.

In accordance with a further embodiment of the present disclosure, there is provided a signal receiving program to be executed by a computer to carry out functions of a signal receiving apparatus having:
  a radius identifying section configured to identify a radius representing a distance from an origin on an IQ plane of signal points each corresponding to a symbol obtained from a received signal modulated by adoption of an APSK modulation method; and
  a parameter outputting section configured to output a control parameter related to a demodulation or decoding process of the received signal on the basis of the identified radius.

In accordance with the embodiments of the present disclosure:
  a radius identifying section identifies a radius representing a distance from an origin on an IQ plane of signal points each corresponding to a symbol obtained from a received signal modulated by adoption of an APSK modulation method; and
  a parameter outputting section outputs a control parameter related to a demodulation or decoding process of the received signal on the basis of the identified radius.

In accordance with the present disclosure, it is possible to demodulate or decode a received signal in a simpler way and at a higher speed in a digital transmission based on APSK modulation by compensating the received signal for distortions caused by nonlinearities.

BRIEF DESCRIPTION OF THE DRAWINGS

FIG. 11 is a block diagram showing a typical configuration of a received-signal decoding apparatus according to another embodiment of the present disclosure; and FIG. 12 is a block diagram showing a typical configuration of a personal computer.

DETAILED DESCRIPTION OF THE PREFERRED EMBODIMENT

An embodiment of the present disclosure is explained by referring to diagrams as follows.

First of all, the configuration of a frame of the advanced BS (broadband satellite) digital broadcasting serving as next-generation broadband satellite digital broadcasting of Japan is explained.

Figure 1:
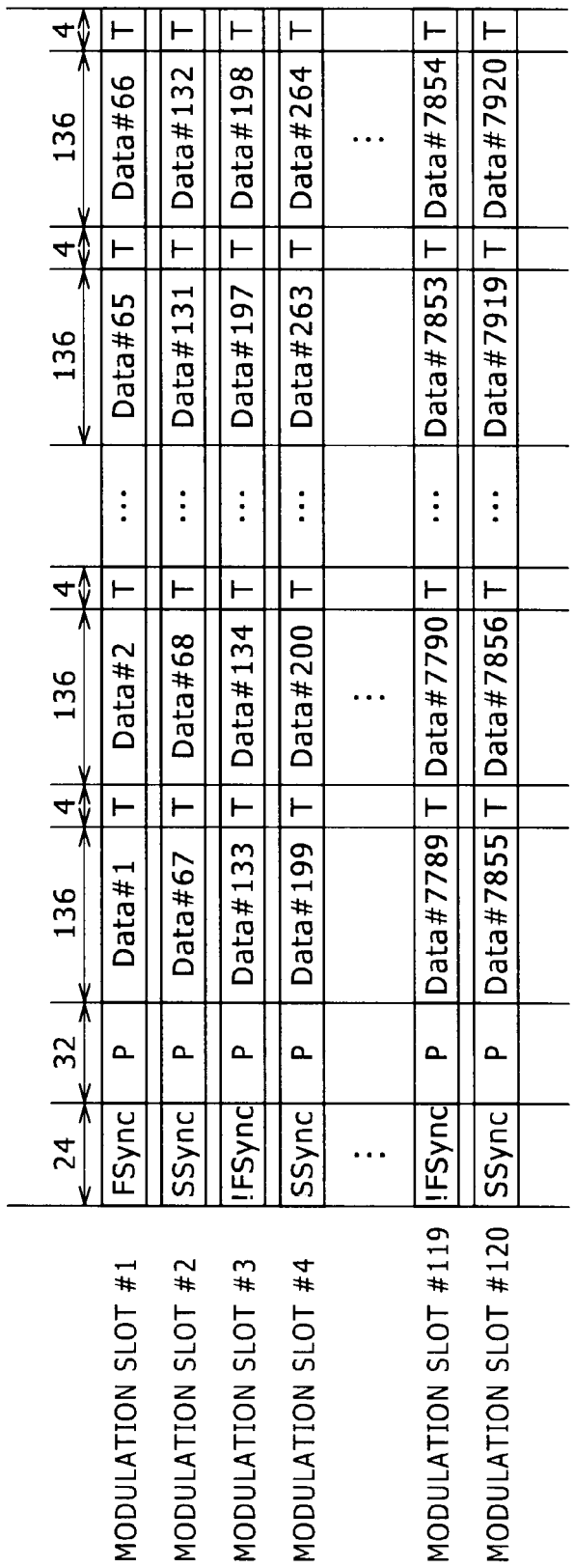
FIG. 1 is an explanatory diagram showing the configuration of a frame of the advanced BS digital broadcasting.

FIG. 1 is an explanatory diagram showing the configuration of a frame of the advanced BS digital broadcasting. As shown in the figure, one frame is configured to include 120 modulation slots. In this typical configuration, the 120 modulation slots are referred to as modulation slot #1 to modulation slot #120 respectively.

Every modulation slot has a group of 24 symbols for synchronization. In the figure, the group of 24 symbols is denoted by notation FSync, SSync and !FSync.

In addition, every modulation slot has a group of 32 symbols for, among other purposes, determining the position of a signal point. This group of 32 symbols is referred to as a transmitted signal point position signal and denoted by notation P.

The symbols are each an already known symbol. The group of 24 symbols used for synchronization and the group of 32 symbols used for, among other purposes, determining the position of a signal point are determined in accordance with specifications.

The group of 24 symbols used for synchronization as described above is also referred to as a synchronization signal. In accordance with the specifications, the modulation slots forming the frame is a group of FSync symbols whereas the second modulation slot is a group of SSync symbols. Also in accordance with the specifications, thereafter, !FSync symbols and SSync symbols are assigned alternately from slot to slot to subsequent modulation slots, that is, the third and fifth modulation slots and so on. The !FSync symbols are each the inverted symbol of the FSync symbol.

Since the SSync is assigned regularly to every other modulation slot, it is generally assumed that the SSync can be used for detecting the head of a modulation slot. In addition, the FSync is assigned to the first modulation slot. In subsequent modulation slots, however, the inverted symbol is used. It is thus generally assumed that, by looking at the code of a correlation value, the symbol group !FSync can be used for detecting the head of each of the subsequent modulation slots.

In addition, every modulation slot includes 66 pieces of transmitted data. Every transmitted data is composed of a group of 136 symbols. For example, the transmitted data included in modulation slot #1 are data #1 to data #66 whereas the transmitted data included in modulation slot #2 are data #67 to data #132. It is to be noted that the 66 pieces of transmitted data each composed of a group of 136 symbols are also referred to as a transmitted main signal.

On top of that, every modulation slot includes TMCCs each provided between two adjacent pieces of transmitted data. Composed of four symbols, the TMCC is control information on transmission and multiplexing. The TMCC is denoted by reference notation T in the figure.

The frame provided with the configuration described above to serve as a frame of the advanced BS digital broadcasting is thus configured to include a total of 1,115,520 symbols.

In addition, in the advanced BS digital broadcasting, it is possible to mix a plurality of different modulation methods within every frame. For example, in a frame, up to eight transmission modes can be defined and, for each of the transmission modes, one of different modulation methods can be adopted. In the advanced BS digital broadcasting, it is possible to adopt five different types of modulation method, that is, the BPSK, QPSK, 8 PSK, 16 PSK and 32 PSK modulation methods.

In the advanced BS digital broadcasting, it is possible to define a transmission mode for every individual modulation slot and modulate the transmitted main signal in accordance with one of the five different types of modulation method. In this case, the transmitted signal point position signal is prescribed to be modulated by adoption of the same modulation method as the transmitted main signal.

The modulation mode adopted for any modulation slot of a specific frame can be identified by analyzing the TMCCs of a frame leading ahead of the specific frame by two frames. Thus, the signal receiving apparatus acquires and stores all the TMCCs inserted into each of modulation slots composing a received frame leading ahead of the specific frame by two frames for use in a later process of identifying the modulation method adopted for any modulation slot of the specific frame.

It is to be noted that, without regard to the transmission mode adopted for each modulation slot, the synchronization signal which is the group of 24 symbols used for synchronization is always modulated by adoption of the n/2 BPSK modulation method. In addition, without regard to the transmission mode adopted for each modulation slot, the TMCC is always modulated also by adoption of the n/2 BPSK modulation method.

By the way, if the APSK modulation method is adopted, the received signal is easily affected by nonlinear characteristics of the amplifier in comparison with transmissions adopting the PSK modulation method. That is to say, in the case of the APSK modulation method, the dynamic range of the amplitude changes increases in comparison with transmissions adopting the PSK modulation method. Thus, effects of distortions generated on a transmission line due to nonlinearities of a signal transmitting amplifier and a signal receiving amplifier become more striking.

Nonlinear characteristics of an amplifier are described as follows.

Figure 2:
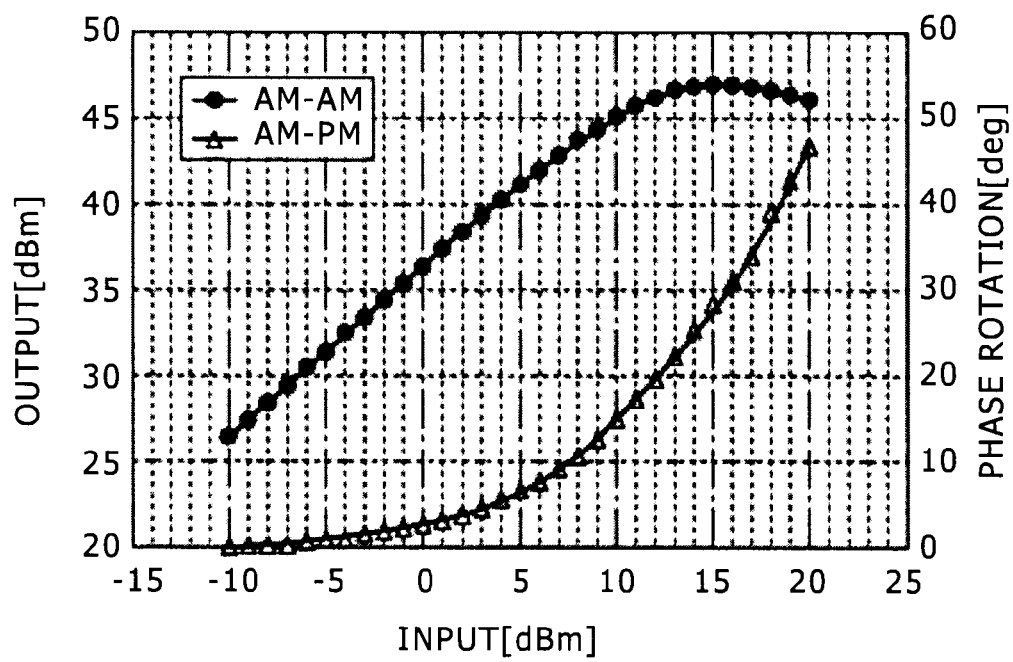
FIG. 2 is an explanatory diagram showing nonlinear characteristics of an amplifier.

FIG. 2 is an explanatory diagram showing ordinary nonlinear characteristics of an amplifier. The horizontal axis of the figure represents the magnitude of the amplitude of an input signal whereas the horizontal axis of the figure represents the magnitude of the amplitude of an output signal or the rotation of the phase of the output signal. In addition, in the same figure, a curve connecting circular plotted points represents an AM-AM (amplitude-to-amplitude) characteristic whereas a curve connecting triangular plotted points represents an AM-PM (amplitude-to-phase) characteristic.

As is obvious from the AM-AM characteristic shown in the same figure, if the amplitude of the input signal increases, the amplitude of the output signal also increases as well. As the amplitude of the input signal exceeds a value of about 10 dBm, however, the amplitude of the output signal does not increase anymore without regard to a change of the amplitude of the input signal.

In addition, as is obvious from the AM-PM characteristic shown in the same figure, if the amplitude of the input signal increases, the rotation of the phase of the output signal also gradually increases. As the input signal exceeds a value of about 5 dBm, however, the rotation of the phase of the output signal increases abruptly with increases of the amplitude of the input signal.

For example, a signal receiving apparatus for receiving a signal modulated by adoption of the APSK modulation method needs to adopt a technology for compensating transmission distortions caused by nonlinearities exhibited by the amplifier as shown in FIG. 2.

Figure 3:
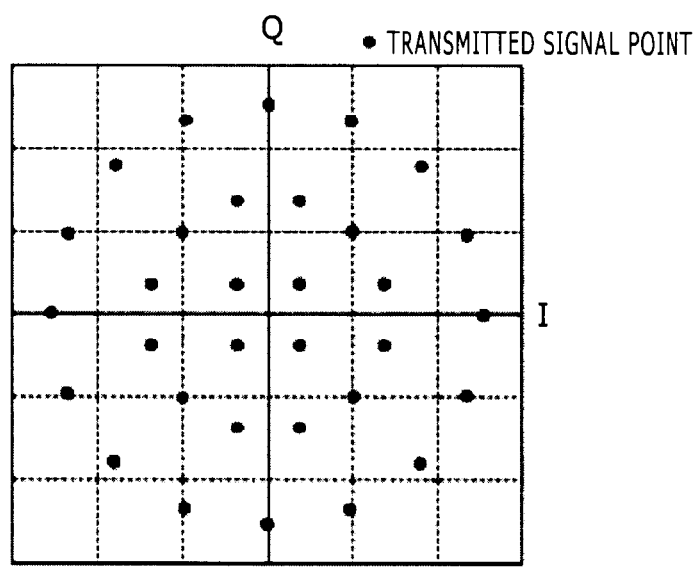
FIG. 3 is an explanatory diagram showing signal points each existing at a position expressed by I and Q coordinates on an IQ plane to serve as signal points of a transmitted signal completing modulation adopting the 32 APSK modulation method.

FIG. 3 is an explanatory diagram showing signal points each existing on an IQ plane to serve as signal points of a transmitted signal completing modulation adopting the 32 APSK modulation method. In the same figure, the horizontal axis is used as the I axis whereas the vertical axis is used as the Q axis. The distance from a center point in the figure to a signal point plotted at a position having IQ coordinates corresponds to the amplitude. The center point coincides with a position having IQ coordinates of (0, 0). As shown in the same figure, every point plotted at a position having IQ coordinates is used as a signal point corresponding to a symbol of the transmitted signal. In a transmitted signal completing modulation adopting the 32 APSK modulation method, 32 symbols of different types can be transmitted.

That is to say, four signal points exist at a shortest distance from the center point whereas 16 signal points exist at a longest distance from the center point. The remaining signal points are 12 signal points existing at an intermediate distance, which is a distance between the shortest and longest distances, from the center point.

In the signal receiving apparatus, a signal point corresponding to a symbol of a received signal is used for identifying one of 32 different coordinate positions shown in FIG. 3 so that demodulation and other processing can be carried out on the transmitted signal. As described earlier by referring to FIG. 2, however, transmission distortions are generated due to nonlinearities of the amplifier. Thus, in actuality, the signal points of an actually received signal become signal points like those shown in FIG. 4.

Figure 4:
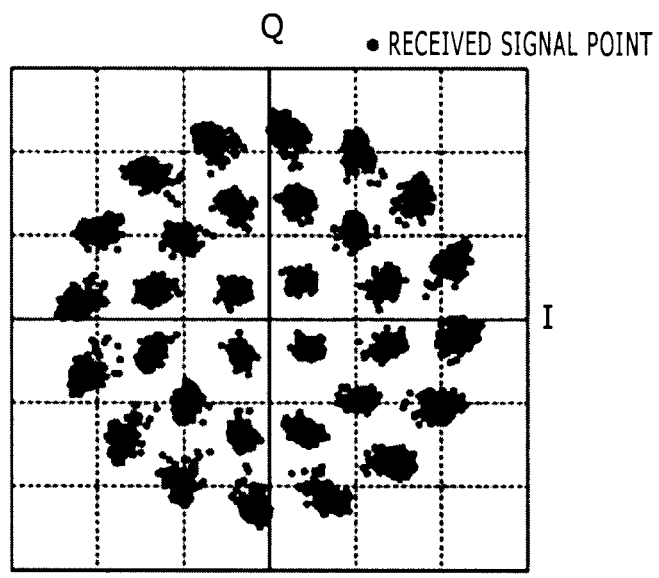
FIG. 4 is an explanatory diagram showing signal points each existing at a position expressed by I and Q coordinates on an IQ plane to serve as signal points of a received signal completing modulation adopting the 32 APSK modulation method.

FIG. 4 is an explanatory diagram showing signal points each existing at a coordinate position on an IQ plane to serve as signal points of a received signal completing modulation adopting the 32 APSK modulation method in the same way as FIG. 3. As shown in FIG. 4, each signal point of the actually received signal is placed at a coordinate position not coinciding accurately with the coordinate position of the corresponding signal point of the transmitted signal shown in FIG. 3. That is to say, the coordinate position of each signal point shown in FIG. 4 is dispersed.

In addition, as shown in FIG. 4, the longer the distance between the center point and a signal point, (that is, the larger the amplitude), the higher the degree of dispersion of the coordinate position at which the signal point is placed.

In order to be able to determine which of the 32 different symbol types corresponds to a signal point of such a received signal, the frame of the advanced BS digital broadcasting is provided with a transmitted signal point position signal expressed by P in every modulation slot as shown in FIG. 1.

Since the transmitted signal point position signal is an already known signal as described above, the signal receiving apparatus is capable of identifying the coordinate position of each of symbols having 32 different types even if there are transmission distortions caused by nonlinear characteristics of the amplifier. That is to say, since the signal receiving apparatus knows which of the 32 different symbol types corresponds to a signal point of a signal received as the transmitted signal point position signal, it is possible to determine how much the coordinate position of every signal point corresponding to a symbol has been shifted.

The signal receiving apparatus for the advanced BS digital broadcasting typically identifies the coordinate position of a signal point of a received signal. The signal point corresponds to one of symbols of a transmitted signal point position signal provided in each of a plurality of modulation slots transmitted in the same transmission mode. If 20 slots have been received in a transmission mode adopting the 32 APSK modulation method for example, 20 transmitted signal point position signals can be received. Thus, 20 signal points corresponding to the first symbol can be identified. By the same token, 20 signal points corresponding to the second symbol can be identified. Finally, 20 signal points corresponding to the 32nd symbol can be identified. Then, the signal receiving apparatus for the advanced BS digital broadcasting computes the average of the coordinate positions of the signal points each corresponding to a symbol for every symbol. In this way, the signal receiving apparatus identifies a reference point of the coordinate positions of each of symbols having the 32 different types.

Figure 5:
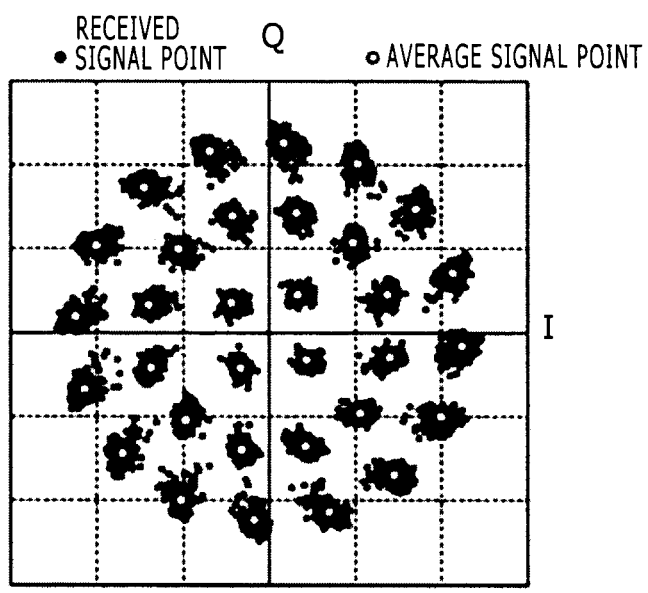
FIG. 5 is an explanatory diagram to be referred to in description of a typical process to compute the average of coordinates positions of signal points in transmitted signal point position signals.

FIG. 5 is an explanatory diagram referred to in the following description of a typical process to compute the average of coordinate positions of signal points of transmitted signal point position signals. FIG. 5 is an explanatory diagram showing signal points each existing on an IQ plane to serve as signal points of transmitted signal point position signals of a transmitted signal completing modulation adopting the 32 APSK modulation method in the same way as FIG. 3. As shown in FIG. 5, the average of coordinate positions of signal points corresponding to a symbol is computed. In this way, the signal receiving apparatus identifies a reference point of the coordinate positions of each of symbols having the 32 different types.

Then, the signal receiving apparatus stores the reference point of the coordinate positions of each of symbols having the 32 different types as reference signal position information to be used in symbol hard determination and likelihood computation.

Figure 6:
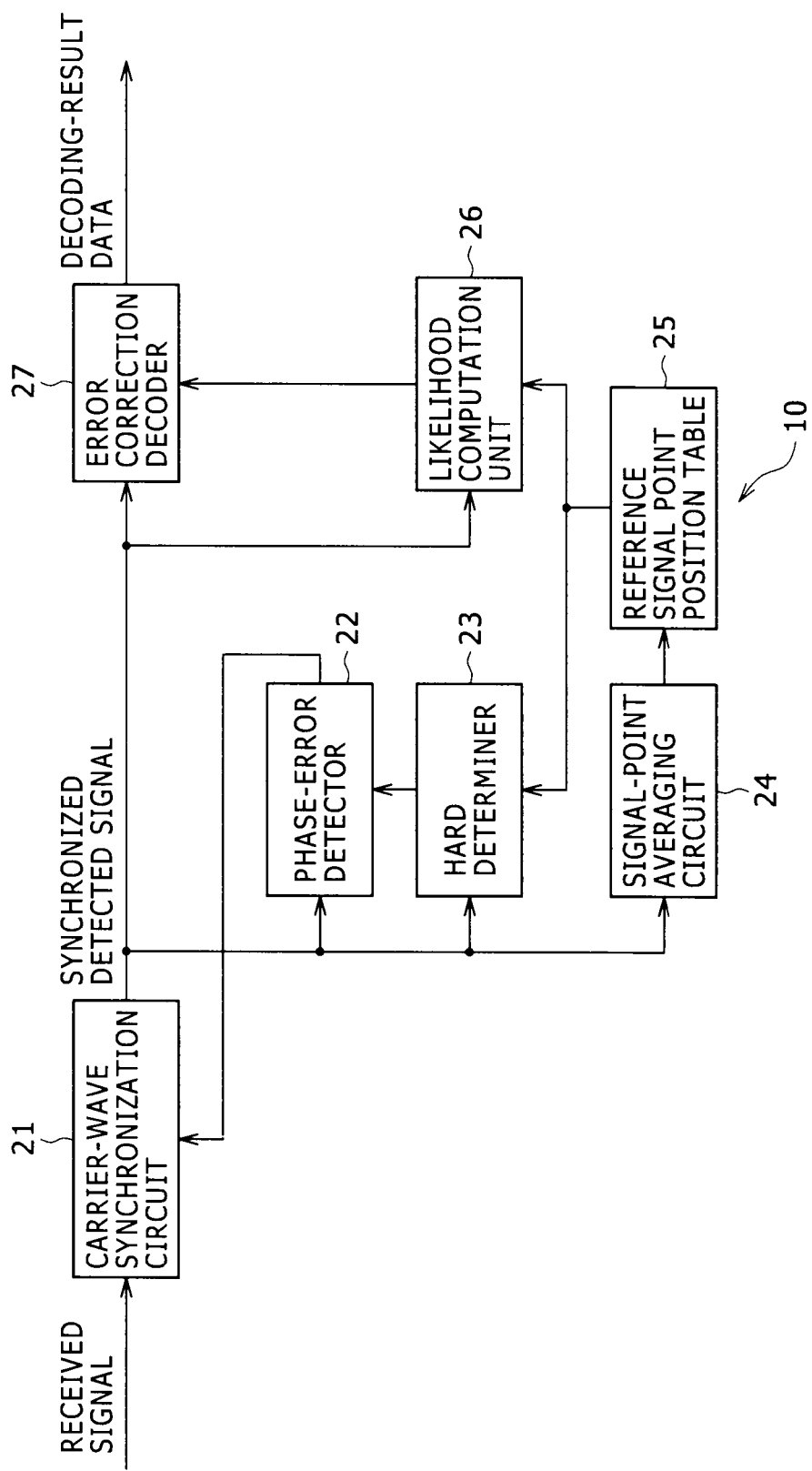
FIG. 6 is a block diagram showing a typical configuration of a demodulation circuit.

FIG. 6 is a block diagram showing a typical configuration of a demodulation circuit employed in a signal receiving apparatus for the advanced BS digital broadcasting.

The demodulation circuit 10 is configured to employ main sections such as a carrier-wave synchronization circuit 21, a phase-error detector 22, a hard determiner 23, a signal-point averaging circuit 24, a signal point position table 25, a likelihood computation unit 26 and an error correction decoder 27.

The carrier-wave synchronization circuit 21 is configured as an ordinary digital PLL (Phase Locked Loop) circuit. The carrier-wave synchronization circuit 21 carries out processing to synchronize the received signal to the frequency of the carrier wave and the phase so as to minimize the variances of a phase error detected by the phase-error detector 22.

On the basis of a synchronized detected signal output by the carrier-wave synchronization circuit, the signal-point averaging circuit 24 computes an average of each of I and Q components of the transmitted signal point position signal obtained from the received signal for every signal point corresponding to one of symbols having 32 different types in order to generate above-mentioned reference signal point position information. It is to be noted that the signal-point averaging circuit 24 receives only the synchronized detected signal for the transmitted signal point position signal.

The reference signal point position information generated by the signal-point averaging circuit 24 is put in the signal-point position table 25 serving as a table used for storing relations between signal-point coordinate positions on an IQ plane used for mapping an equal binary pattern and a multi-value binary pattern.

The hard determiner 23 computes a boundary line on the IQ plane when hard determination is to be made on a signal point on the basis of the signal-point position table 25 and carries out hard-determination processing based on the boundary line.

The phase-error detector 22 finds a phase error between a hard-determination value output by the hard determiner 23 and the synchronized detected signal in order to detect a phase error.

The likelihood computation section 26 takes each signal point indicated by reference signal point position information retrieved from the signal-point position table 25 as an ideal signal point to compute an LLR (Log Likelihood Ratio) of each of bits composing the binary pattern mapped onto signal points.

The error correction decoder 27 decodes LDCP codes on the basis of the LLRs, outputting decoding-result data.

Such a demodulation circuit 10 is capable of carrying out carrier wave synchronization and error correction decoding to give rise to fewer deteriorations even for a received signal with much shifted distributions of the amplitude of a signal point and the phase of the signal point due to distortions caused by nonlinearities.

Figure 7:
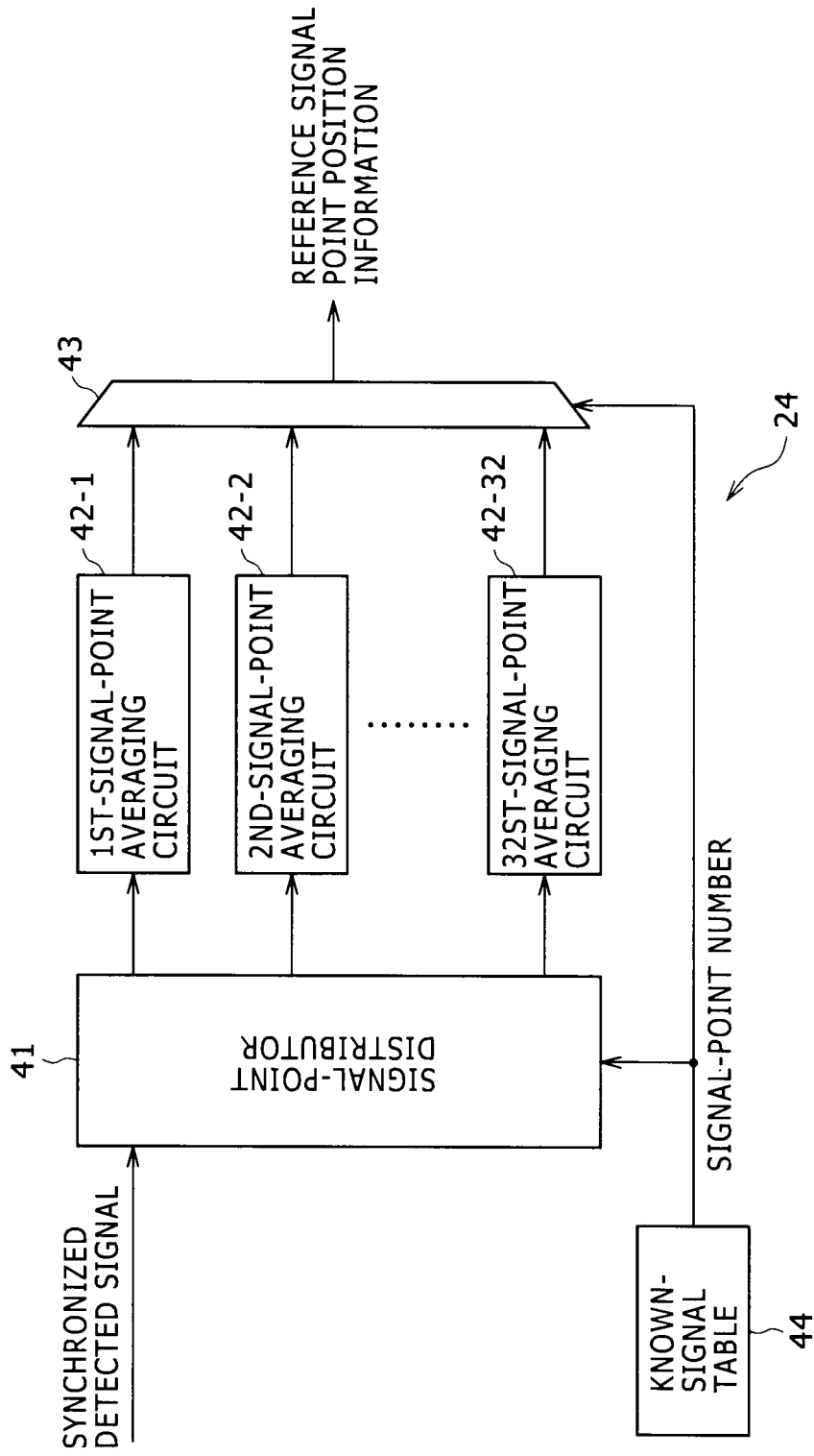
FIG. 7 is a block diagram showing a detailed typical configuration the existing signal-point averaging circuit employed in the demodulation circuit shown in FIG. 6.

FIG. 7 is a block diagram showing a detailed typical configuration the existing signal-point averaging circuit employed in the demodulation circuit 10 shown in FIG. 6.

As shown in FIG. 7, the existing signal-point averaging circuit 24 is configured to employ a signal-point distributor 41, a 1st-signal-point averaging circuit 42-1, a 2nd-signal-point averaging circuit 42-2, - - - - and a 32nd-signal-point averaging circuit 42-32, a selector circuit 43 and a known-signal table 44.

It is to be noted that the numbers 1, 2, - - - - and 32 included in the 1st-signal-point averaging circuit 42-1, 2nd-signal-point averaging circuit 42-2, - - - - and 32nd-signal-point averaging circuit 42-32 are each a signal-point number used for identifying a symbol corresponding to the signal point. In this case, the signal-point number N corresponds to a symbol representing a binary pattern mapped onto the signal point. In the case of a signal modulated by adoption of the 32 APSK method, N=1 corresponds to "0000," N=2 corresponds to "0001," N=3 corresponds to "0010" and N=32 corresponds to "1111," respectively.

The known-signal table 44 sequentially outputs signal-point numbers of symbols in an order of the positions of the symbols in the transmitted signal point position information typically on the basis of a timing control signal synchronized with transmitted-frame boundaries of the synchronized detected signal.

The signal-point distributor 41 distributes synchronized detected signals to the averaging circuits in accordance with the signal-point numbers received from the known-signal table 44.

The 1st-signal-point averaging circuit 42-1 to the 32nd-signal-point averaging circuit 42-32 each compute an average of each of the I and Q components included in the synchronized detected signals received from the signal-point distributor 41 over a sufficiently long period of time.

The selector circuit 43 sequentially outputs the averages, which have been computed for the signal-point numbers, by switching the input to the selector circuit 43 from any one of the averages to another average. In this way, the selector circuit 43 serially outputs pieces of reference signal point position information of all signal points.

In the demodulation circuit 10 having the configuration described above, however, it is necessary to compute an average of received signals for every signal point. Thus, the number of multi values in the APSK modulation increases and, the larger the number of signal points, the larger the number of signal-point averaging circuits which are demanded. That is to say, the number of signal-point averaging circuits is proportional to the number of signal points. As a result, there is concern that the scale of the demodulation circuit 10 increases.

In addition, the larger the number of signal points, the lower the frequency at which the signal points are transmitted. That is to say, the frequency at which signal points are transmitted is inversely proportional to the number of aforementioned signal points. Thus, in the demodulation circuit 10, there is raised a problem that the convergence time is long. The convergence time is defined as the time it takes to obtain sufficient results of compensation for distortions caused by nonlinearities by computing an average of all signal points.

In order to solve the problems described above, in accordance with the present disclosure, the number of signal-point averaging circuits is repressed even if the number of signal points is large. In addition, the present disclosure reduces the convergence time, which is defined as the time it takes to obtain sufficient results of compensation for distortions caused by nonlinearities, by as much as possible.

Figure 8:
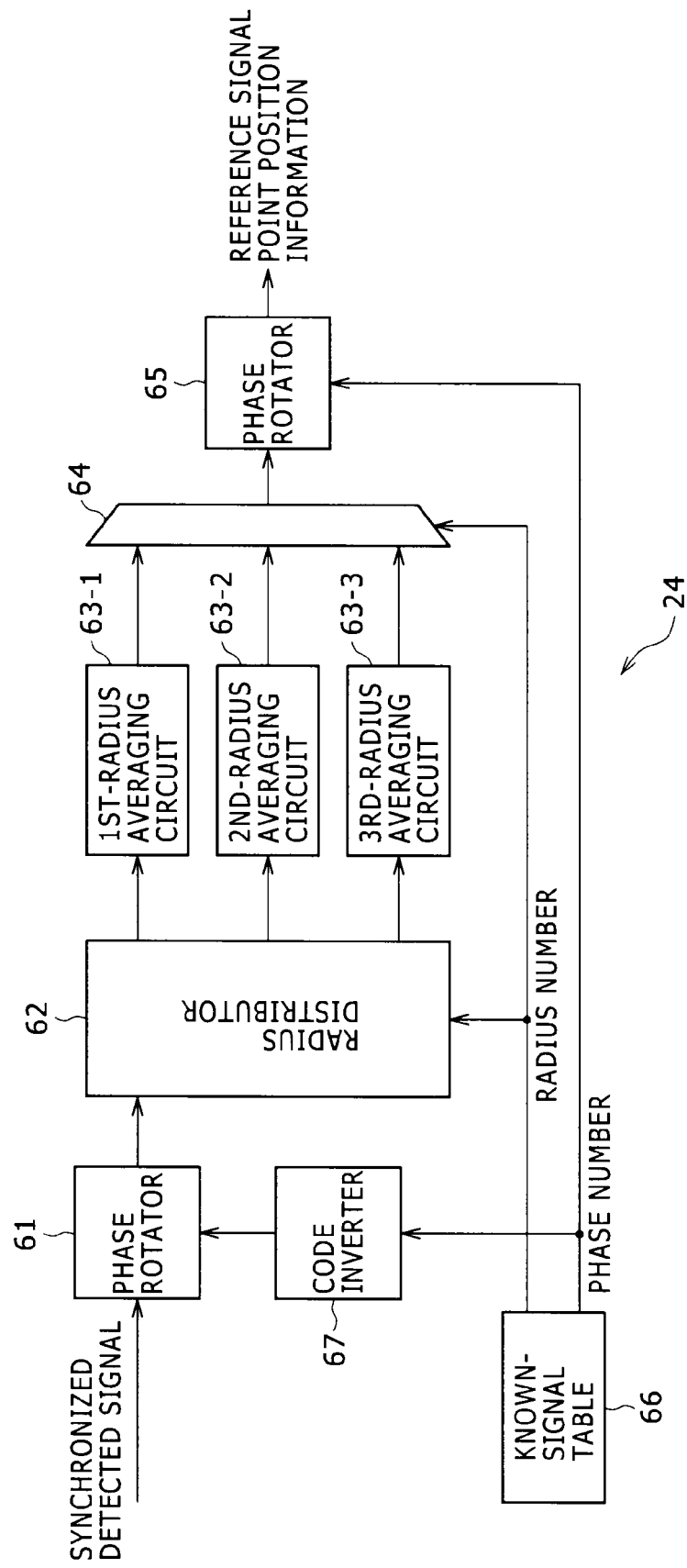
FIG. 8 is a block diagram showing a detailed typical configuration a signal-point averaging circuit employed in a demodulation circuit according to an embodiment of the present disclosure.

FIG. 8 is a block diagram showing a typical configuration of the signal-point averaging circuit 24 employed in the demodulation circuit 10 according to an embodiment of the present disclosure. The typical configuration of the signal-point averaging circuit 24 shown in FIG. 8 is typically the typical configuration of the signal-point averaging circuit 24 employed in the demodulation circuit 10 shown in FIG. 6.

The typical configuration of the signal-point averaging circuit 24 shown in FIG. 8 is configured to employ a phase rotator 61, a radius distributor 62, a 1st-radius averaging circuit 63-1, a 2nd-radius averaging circuit 63-2, a 3rd-radius averaging circuit 63-3, a selector circuit 64, a phase rotator 65, a known-signal table 66 and a code inverter 67.

The known-signal table 66, for example, sequentially outputs radius and phase numbers of signal points each corresponding to a symbol in the order of the positions of the symbols in the transmitted signal point position information typically on the basis of a timing control signal synchronized to transmitted-frame boundaries of the synchronized detected signal. In this case, the radius number of a signal point corresponding to a symbol is a number used for identifying a radius obtained from the coordinate position of the signal point as the radius representing the magnitude of the amplitude of the signal point. By the same token, the phase number of a signal point corresponding to a symbol is a number used for identifying a phase obtained from the coordinate position of the signal point as the phase of the signal point.

Figure 9:
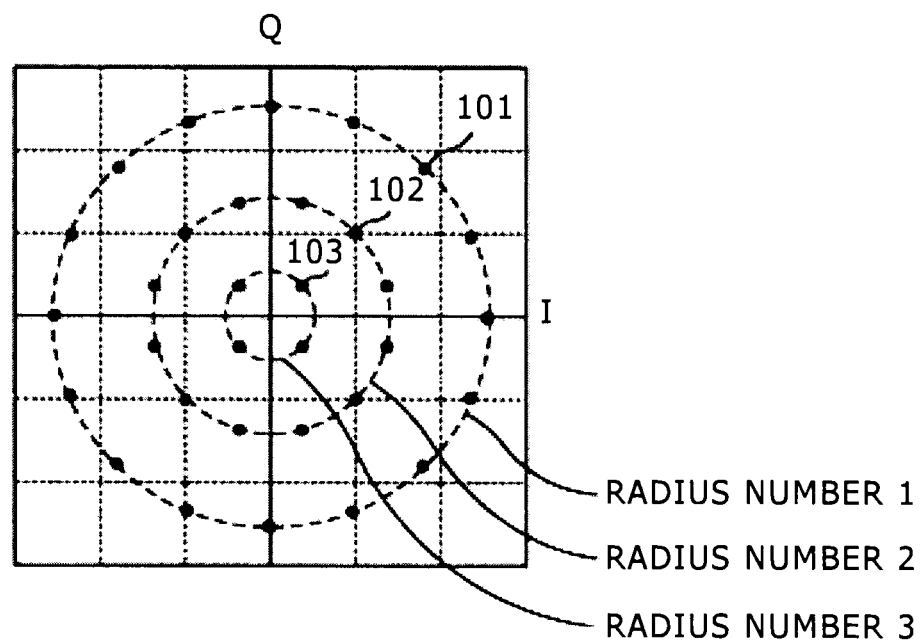
FIG. 9 is an explanatory diagram to be referred to in description of radius and phase numbers of a signal point.

FIG. 9 is an explanatory diagram of radius and phase numbers of a signal point. In the same figure, the horizontal axis is used as the I axis whereas the vertical axis is used as the Q axis. Each black circular point shown in the figure represents the coordinate position of a signal point corresponding to a symbol in a signal modulated by adoption of the 32 APSK modulation method.

As shown in the same figure, signal points of 32 different types can be categorized into three signal-point categories having radiuses different from each other. It is to be noted that a distance between a signal point and the center point at coordinates of (0, 0) represents the magnitude of the amplitude of the signal point and is referred to as the radius of the signal point.

That is to say, 16 signal points exist on the circumference of a circle having the longest radius represented by a distance between the circumference and the center point at coordinates of (0, 0). The radius number of these 16 signal points is set at 1. In addition, four signal points exist on the circumference of a circle having the shortest radius represented by a distance between the circumference and the center point at coordinates of (0, 0). The radius number of these four signal points is set at 3. On top of that, 12 signal points exist on the circumference of a circle having an intermediate radius represented by a distance between the circumference and the center point at coordinates of (0, 0). The radius number of these 12 signal points is set at 2. The intermediate radius has a length between the lengths of the longest and shortest radiuses.

In addition, the signal points of 32 different types can be categorized into 24 signal-point groups having phases different from each other. For example, let a signal point on the I axis on the right-hand side of the figure have a phase of 0°. Also, the 16 signal points each having the radius number 1 have phases of 0°, 22.5°, 45°, 67.5°s and so on whereas the 12 signal points each having the radius number 2 have phases of 15°, 45°, 75° and so on. Furthermore, the four signal points each having the radius number 3 have phases of 45°, 135°, and so on respectively. Thus, for example, by assigning the phase number 1 to the phase of 0°, the phase number 2 to the phase of 15°, the phase number 3 to the phase of 22.5°, the phase number 4 to the phase of 45° and so on, the phases of signal points can be categorized into 24 signal-point groups having 24 different phase numbers respectively.

Thus, for example, signal point 101 has the radius number 1 and the phase number 4. Also, signal point 102 has the radius number 2 and the phase number 4. Further, signal point 103 has the radius number 3 and the phase number 4.

The known-signal table 66 sequentially outputs such radius numbers and such phase numbers for every symbol corresponding to a signal point serving as an object of processing.

It is to be noted that, although it is assumed as a premise that the radius and phase numbers sequentially output from the known-signal table 66 are radius and phase numbers stored in advance for the transmitted signal point position information, the radius and phase numbers of a signal point obtained as a result of a hard decision can also be output, for example.

Referring back to FIG. 8, on the basis of a phase number output from the known-signal table 66 as a phase number assigned to a signal point, the code inverter 67 identifies the phase of the signal point and inverts the code of the phase, supplying the inverted code to the phase rotator 61.

On the basis of information supplied from the code inverter 67, the phase rotator 61 rotates the phase of a signal point serving as an object of processing. That is to say, the code inverter 67 and the phase rotator 61 carry out offset processing on a phase modulation component of a symbol corresponding to a signal point serving as an object of processing. It is to be noted that, since a symbol obtained from a synchronized detected signal of a received signal normally has a phase error, the phase modulation component by no means becomes equal to 0 even after the offset processing has been carried out on a phase modulation component.

The radius distributor 62 apportions a synchronized detected signal to the radius averaging circuit 63 associated with the radius number output from the known-signal table 66. That is to say, if the synchronized detected signal is a signal for a signal point having the radius number 1, the radius distributor 62 supplies (apportions) the synchronized detected signal to the 1st-radius averaging circuit 63-1. Also, if the synchronized detected signal is a signal for a signal point having the radius number 2, the radius distributor 62 supplies (apportions) the synchronized detected signal to the 2nd-radius averaging circuit 63-2. In the same way, if the synchronized detected signal is a signal for a signal point having the radius number 3, the radius distributor 62 supplies (apportions) the synchronized detected signal to the 3rd-radius averaging circuit 63-3.

The 1st-radius averaging circuit 63-1 to the 3rd-radius averaging circuit 63-3 each compute an average of each of the I and Q components of a synchronized detected signal received from the radius distributor 62 over a time period determined in advance.

As described above, in the signal-point averaging circuit 24 according to the present disclosure, signal points for which offset processing has been carried out by the code inverter 67 and the phase rotator 61 on the phase modulation components of the symbols are averaged for every radius. For example, in the 1st-radius averaging circuit 63-1, for all the 16 signal points of different types all having the radius number 1, the offset processing is carried out on the phase modulation components and an average is computed. That is to say, in the signal-point averaging circuit 24 according to the present disclosure, signal points having the same radius number are subjected to an averaging process in a single uniform way.

Thus, an averaging result output by the 1st-radius averaging circuit 63-1 is a result of computing an average for each of signal points having the 16 different types and represents a shift expressed in terms of degrees from a phase of 0°. The averaging result output by the 1st-radius averaging circuit 63-1 is an average radius for each of signal points having the 16 different types. It is to be noted that, by making use of the average radius, for example, an average of distances from the center point to the signal points of the 16 different types can also be used for determining the difference from the supposed distance corresponding to the radius number 1.

By the same token, an averaging result output by the 2nd-radius averaging circuit 63-2 is a result of computing an average for each of signal points having the 12 different types and represents a shift expressed in terms of degrees from a phase of 0°. The averaging result output by the 2nd-radius averaging circuit 63-2 is an average radius for each of signal points having the 12 different types. Likewise, an averaging result output by the 3rd-radius averaging circuit 63-3 is a result of computing an average for each of signal points having the four different types and represents a shift expressed in terms of degrees from a phase of 0°. The averaging result output by the 3rd-radius averaging circuit 63-3 is an average radius for each of signal points having the four different types.

The selector circuit 64 sequentially outputs the averages, which have been computed for the radius numbers, by switching the input to the selector circuit 64 from any one of the averages to another average.

On the basis of a phase number output from the known-signal table 66 as a phase number of a signal point, the phase rotator 65 identifies the phase of the signal point serving as an object of processing and rotates the phase of the signal point. Thus, the phase modulation component of a symbol completing the offset processing carried out by the code inverter 67 and the phase rotator 61 can be restored to its original value.

In this way, pieces of reference signal point position information of all signal points are output serially from the phase rotator 65.

As described above, the signal-point averaging circuit 24 according to the present disclosure is provided with a radius averaging circuit 63 for every radius. Thus, even if the signal-point averaging circuit 24 generates reference signal point position information of signal points from a signal modulated by adoption of the 32 APSK modulation method, it is sufficient to provide the signal-point averaging circuit 24 with three radius averaging circuits 63, that is, the 1st-radius averaging circuit 63-1 to the 3rd-radius averaging circuit 63-3. That is to say, in accordance with the present disclosure, the number of radius averaging circuits 63 can be repressed even if the number of signal points is large. It is thus possible to prevent the size of the signal receiving apparatus and the cost of manufacturing the signal receiving apparatus from increasing.

In addition, as described above, in the signal-point averaging circuit 24 according to the present disclosure, signal points having the same radius number are subjected to an averaging process in a single uniform way. Thus, in processing to compute an average value of each of I and Q components of the synchronized detected signal for a unit time, the numerical value of the denominator can be increased.

That is to say, in the case of the existing signal-point averaging circuit 42 shown in FIG. 7 for example, an average is computed for every signal-point number. Thus, it takes sufficiently long time to accumulate samples for one signal-point number. In the case of the radius averaging circuit 63 provided by the present disclosure shown in FIG. 8, on the other hand, an average is computed for every signal-point radius. Thus, for example, the time it takes to obtain reference signal point position information for a signal point 101 shown in FIG. 9 can be reduced to $\frac{1}{16}$ of the time demanded by the existing signal-point averaging circuit 42 to obtain reference signal point position information. In the case of the existing signal-point averaging circuit 42 used for computing an average of 16 samples for the signal point 101 shown in FIG. 9 for example, it is necessary to receive 16 pieces of reference signal point position information. If the radius averaging circuit 63 according to the present disclosure is used, on the other hand, it is sufficient to receive reference signal point position information once.

By the same token, in accordance with the present disclosure, for example, the time it takes to obtain reference signal point position information for a signal point 102 shown in FIG. 9 can be reduced to $\frac{1}{12}$ of the time demanded by the existing signal-point averaging circuit 42 to obtain reference signal point position information. Likewise, the time it takes to obtain reference signal point position information for a signal point 103 shown in FIG. 9 can be reduced to $\frac{1}{4}$ of the time demanded by the existing signal-point averaging circuit 42 to obtain reference signal point position information.

As described above, in accordance with the present disclosure, it is possible to shorten the convergence time which is defined as the time it takes to obtain sufficient results of compensation of a received signal for distortions caused by nonlinearities.

In addition, in accordance with the present disclosure, the longer the distance between the center point and a signal point (the larger the amplitude of a signal point), the larger the reduction by which the time it takes to acquire reference signal point position information of the signal point can be shortened. As described earlier by referring to FIG. 2, with regard to the nonlinear characteristics of the amplifier, for both the AM-AM characteristic and the AM-PM characteristic, the larger the amplitude of the input signal, the more conspicuous the degree of nonlinearity. Thus, in processing to receive a signal modulated by adoption of the 32 APSK modulation method for example, it is possible to think that the compensation of the received signal for distortions caused by nonlinearities needs to be carried out more preferentially on a signal point having the radius number 1.

As described above, in accordance with the present disclosure, the larger the amplitude of a signal point, the larger the reduction by which the time it takes to acquire reference signal point position information of the signal point can be shortened. In addition, from another point of view, during a process of computing an average in a given period of time, the larger the amplitude of a signal point, the higher the precision of the reference signal point position information of the signal point. Thus, in accordance with the present disclosure, for processing to receive a signal modulated by adoption of a modulation method for a large number of signal points as is the case with a signal broadcasted in the advanced BS digital broadcasting for example, a specially excellent demodulation circuit can be implemented.

Figure 10:
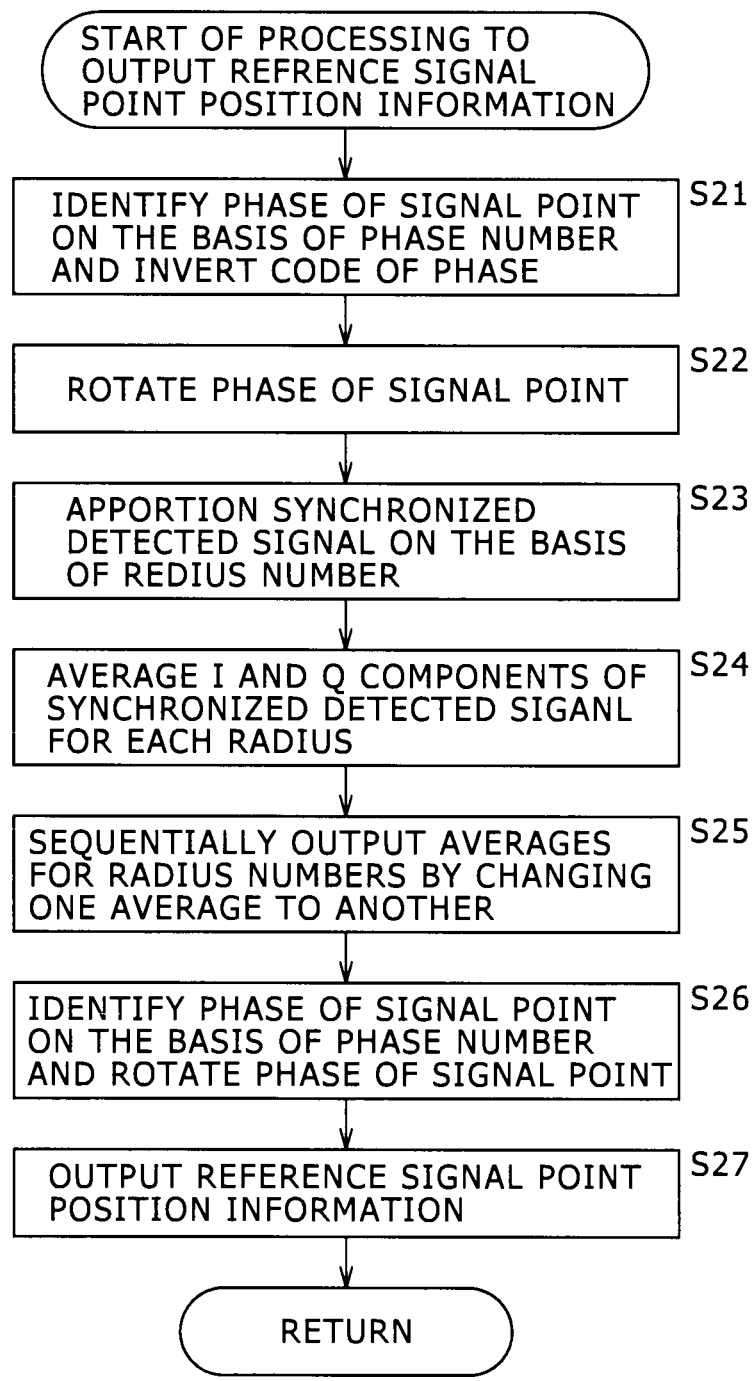
FIG. 10 shows a flowchart representing processing to output reference signal point position information.

Next, by referring to a flowchart shown in FIG. 10, the following description explains processing carried out by the signal-point averaging circuit 24 shown in FIG. 8 to output the reference signal point position information.

The flowchart begins with a step S21 at which, on the basis of a phase number output from the known-signal table 66 as a phase number assigned to a signal point, the code inverter 67 identifies the phase of the signal point. In addition, the code inverter 67 also inverts the code of the phase.

Then, at the next step S22, on the basis of information received from the code inverter 67 as a result of the process carried out at the step S21, the phase rotator 61 rotates the phase of the signal point serving as an object of processing. It is thus possible to carry out an offset process on the phase modulation component of a symbol corresponding to the signal point serving as an object of processing.

Subsequently, at the next step S23, the radius distributor 62 apportions a synchronized detected signal to a radius averaging circuit 63 provided for the signal in accordance with the radius number output from the known-signal table 66.

Then, at the next step S24, the 1st-radius averaging circuit 63-1 to the 3rd-radius averaging circuit 63-3 each compute an average value of each of I and Q components of the synchronized detected signal received from the radius distributor 62 during a time period determined in advance.

Subsequently, at the next step S25, the selector circuit 64 sequentially outputs the averages, which have been computed for the radius numbers, by switching from any one of the averages to another average.

Then, at the next step S26, on the basis of a phase number output from the known-signal table 66 as a phase number assigned to a signal point, the phase rotator 65 identifies the phase of the signal point. In addition, the phase rotator 65 also rotates the phase of the signal point which serves as an object of processing. Thus, the symbol phase modulation component subjected to the offset process carried out at the step S22 is restored to its original value.

Subsequently, at the next step S27, the reference signal point position information is output.

The processing to output the reference signal point position information is carried out as described above.

In accordance with the above description, the positions of signal points of a signal modulated by adoption of the APSK modulation method are laid out to form typically a circle. However, the positions are laid out to form not only a circle, but also a shape of the rectangular type (that is, QAM), the triangular type, the hexagonal type, the star type or another type. That is to say, the present disclosure can be applied to any arbitrary configuration as long as, in the configuration, the positions of signal points are laid out to have a plurality of signal points having the same radius.

In addition, in accordance with the above description, in order to obtain the reference signal point position information, there is provided a typical configuration in which an average of signal points is computed for every radius. However, it is also possible to provide another typical configuration in which, for signal points having different radiuses, for example, control parameters varying in accordance with the radius are used to carry out synchronization and adaptive equalization.

As an example, for every radius, the loop gain of a digital PLL circuit is switched to another value determined by the radius. As another example, for every radius, the step size of tap updating in an adaptive equalizer is switched to another value determined by the radius. Depending on the transmission distortion such as the distortion generated due to nonlinearities of the amplifier in a signal modulated by adoption of the APSK modulation method, the determination error rate of the hard determiner used in phase error detection and equalization error detection is assumed to vary from radius to radius. Thus, by switching the control parameter for every radius as described above, the control errors in the carrier wave synchronization and the adaptive equalization can be minimized so that the signal receiving performance can be further improved.

FIG. 11 is a block diagram showing a typical configuration of a received-signal decoding apparatus 130 according to another embodiment of the present disclosure.

As shown in the figure, the received-signal decoding apparatus 130 employs an adaptive equalizer 131, a carrier-wave synchronization circuit 132 and an error correction decoder 133. In addition, the received-signal decoding apparatus 130 also has a phase-error detector 134, a hard determiner 135, an equalization-error detector 136, a phase rotator 137 and a tap-gain control section 138. On top of that, the received-signal decoding apparatus 130 also includes a step-size table 139, a selector circuit 140, a loop-gain table 141 and a selector circuit 142.

The adaptive equalizer 131 is typically configured as an adaptive equalizer having the type of an ordinary transversal filter. The adaptive equalizer 131 equalizes transmission distortions caused by a multi-path line or the like. That is to say, the adaptive equalizer 131 compensates a received signal for equalization errors detected by the equalization-error detector 136.

The adaptive equalizer 131 equalizes the transmission distortions by carrying out filter processing according to a tap gain received from the tap-gain control section 138. The tap-gain control section 138 controls the tap gain on the basis of a step size retrieved from the step-size table 139 by way of the selector circuit 140 and on the basis of equalization errors supplied thereto by the equalization-error detector 136 by way of the phase rotator 137.

The carrier-wave synchronization circuit 132 generates carrier waves having a phase synchronized to the phase of carrier waves used in modulation carried out on the signal transmission side and carries out detection by making use of the generated carrier waves in order to demodulate the received signal.

The carrier-wave synchronization circuit 132 is configured to employ a loop filter having an internal digital PLL circuit. The loop filter compensates an input signal for a phase error on the basis of a detected value output by the phase-error detector 134 as the detected value of the phase error. The band frequencies of the loop filter are determined on the basis of a loop gain retrieved from the loop-gain table 141 by way of the selector circuit 142.

The hard determiner 135 makes hard determination on a synchronized detected signal to identify a symbol corresponding to a signal point and outputs a radius number used for identifying the radius of the signal point.

The phase-error detector 134 detects a phase error from the synchronized detected signal on the basis of information on the symbol identified by the hard determiner 135 as a symbol corresponding to a signal point and feeds back the phase error to the carrier-wave synchronization circuit 132.

The equalization-error detector 136 detects an equalization error of the synchronized detected signal on the basis of information on the symbol identified by the hard determiner 135 as a symbol corresponding to a signal point.

The phase rotator 137 rotates the phase of the equalization error output by the equalization-error detector 136 on the basis of an inverted-polarity value of a phase correction quantity output by the carrier-wave synchronization circuit 132. Thus, the equalization error of the so-called base band is converted into an equalization error of a path band.

The step-size table 139 is used for pre-storing step sizes proper for radius numbers of signal points. In this typical configuration, the step-size table 139 is used for pre-storing three different step sizes proper for respectively three radius numbers of signal points of a signal modulated by adoption of the 32 APSK modulation method. To be more specific, the step-size table 139 is used for pre-storing a step size m_r1 proper for the radius number 1, a step size m_r2 proper for the radius number 2 and a step size m_r3 proper for the radius number 3.

On the basis of a radius number output from the hard determiner 135, the selector circuit 140 selects a step size according to the radius number among step sizes retrieved from the step-size table 139 and supplies the selected step size to the tap-gain control section 138.

The loop-gain table 141 is used for pre-storing loop gains proper for radius numbers of signal points. In this typical configuration, the loop-gain table 141 is used for pre-storing three different loop gains proper for respectively three radius numbers of signal points of a signal modulated by adoption of the 32 APSK modulation method. To be more specific, the loop-gain table 141 is used for pre-storing a step size g_r1 proper for the radius number 1, a step size g_r2 proper for the radius number 2 and a step size g_r3 proper for the radius number 3.

On the basis of a radius number output from the hard determiner 135, the selector circuit 142 selects a loop gain according to the radius number among loop gains retrieved from the loop-gain table 141 and supplies the selected loop gain to the loop filter employed in the carrier-wave synchronization circuit 132.

The error correction decoder 133 obtains data of symbols of the received signal on the basis of the synchronized detected signal received from the carrier-wave synchronization circuit 132 and carries out error correction processing on the data in order to decode the data of the received signal.

As described above, by making use of the received-signal decoding apparatus 130, it is possible to minimize control errors in the carrier-wave synchronization and the adaptive equalization and, hence, further improve the signal receiving performance.

For example, as is generally known, the loop filter has characteristics described as follows. In the case of a loop filter having a broad band, the characteristic exhibited by the loop filter to follow phase error variations is improved but the number of jitters of the synchronized detected signal output by the PLL circuit becomes large. In the case of a loop filter having a narrow band, on the other hand, the characteristic exhibited by the loop filter to follow phase error variations is poor but the number of jitters of the synchronized detected signal is small. Depending on the transmission distortion such as the distortion generated due to nonlinearities of the amplifier in a signal modulated by adoption of the APSK modulation method, the determination error rate of the hard determiner used in phase error detection and equalization error detection is assumed to vary from radius to radius. Thus, for example, it is desirable to change also quantities such as the loop gain of the loop filer for every radius.

In the typical configuration of the received-signal decoding apparatus 130 described above by referring to FIG. 11, a proper step size and a proper loop gain are stored in advance in the step-size table 139 and the loop-gain table 141 respectively for every radius. After the hard determiner 135 has identified a radius number, the step-size table 139 and the loop-gain table 141 are searched for respectively a step size and a loop gain which are proper for the radius number.

It is to be noted that the series of processes described previously can be carried out by hardware and execution of software. If the series of processes described above is carried out by execution of software, programs composing the software can be installed into a computer embedded in dedicated hardware from typically a network or a recording medium. Also, a general-purpose personal computer 700 shown in FIG. 12, for example, can be installed from a network or a recording medium, to be made capable of carrying out a variety of functions by installing a variety of programs into the personal computer.

In FIG. 12, a CPU (Central Processing Unit) 701 carries out various kinds of processing by execution of programs stored in a ROM (Read Only Memory) 702 or programs loaded from a storage section 708 into a RAM (Random Access Memory) 703. The RAM 703 is also used for properly storing various kinds of information such as data demanded by the CPU 701 in execution of the processing.

The CPU 701, the ROM 702 and the RAM 703 are connected to each other by a bus 704, which is also connected to an input/output interface 705.

The input/output interface 705 is also connected to an input section 706 and an output section 707. The input section 706 includes a keyboard and a mouse whereas the output section 707 includes a display unit such as an LCD (Liquid Crystal Display) unit and a speaker. The input/output interface 705 is also connected to the storage section 708 and a communication section 709. The storage section 708 is configured to include a hard disk. The communication section 709 is configured to employ a modem and a network interface card such as a LAN (Local Area Network) card. The communication section 709 is a unit for carrying out communication processing with other apparatus through a network including the Internet.

If necessary, the input/output interface 705 is also connected to a drive 710 on which a removable recording medium 711 is mounted. The removable recording medium 711 can be a magnetic disk, an optical disk, a magneto-optical disk or a semiconductor memory. Then, a computer program read out from the removable recording medium 711 is installed into the storage section 708, as required.

As explained earlier, if the series of processes described above is carried out by execution of software, programs composing the software can be installed from typically a network such as the Internet or a recording medium such as the removable recording medium 711.

It is to be noted that, the aforementioned recording medium is the removable recording medium 711 provided to the user separately from the main unit of the general-purpose personal computer 700 as shown in FIG. 12. Typical examples of the removable recording medium 711 include the magnetic disk (including a flexible disk (registered trademark)), the optical disk (including a CD-ROM (Compact Disk-Read Only Memory) or a DVD (Digital Versatile Disk)), the magneto-optical disk (an MD (Mini Disk) (registered trademark)) as well as the semiconductor memory. Instead of installing the programs from the removable recording mediums 711, the programs can also be stored in advance in an embedded recording medium included in the main unit of the general-purpose personal computer 700 to be provided to the user. Typical examples of the embedded recording medium are a hard disk included in the storage section 708 and the ROM 702.

It is also worth noting that, in this specification of the disclosure, steps of the flowchart described above can of course be carried out in a pre-prescribed order along the time axis. However, the steps can be carried out not only in a pre-prescribed order along the time axis, but also concurrently or individually.

In addition, it should be understood by those skilled in the art that a variety of modifications, combinations, sub-combinations and alterations may occur, depending on design requirements and other factors as far as they are within the scope of the appended claims or the equivalents thereof.

The present disclosure contains subject matter related to that disclosed in Japanese Priority Patent Application JP 2010-205427 filed in the Japan Patent Office on Sep. 14, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal receiving apparatus comprising:
    a radius identifying section configured to identify a radius representing distance of each signal point of a plurality of signal points from origin of a corresponding IQ plane, wherein each signal point corresponds to a symbol obtained from a received signal modulated by amplitude phase shift keying modulation scheme; and
    a parameter outputting section configured to output a control parameter related to a demodulation process of said received signal on the basis of said identified radius, wherein a reference signal point position information is used as a reference in determination of said symbol of said received signal and likelihood computation by restoring a phase component already subjected to an offset processing to its original value.

2. The signal receiving apparatus according to claim 1, wherein said radius identifying section identifies said radius by outputting information representing said radius of said signal point of a zone comprising a modulated known symbol in a frame composing said received signal.

3. The signal receiving apparatus according to claim 2, wherein said received signal is a broadcast signal of advanced broadband satellite digital broadcasting and said zone comprising a modulated known symbol is a zone comprising a modulated transmitted signal point position signal.

4. The signal receiving apparatus according to claim 3, wherein said radius identifying section pre-stores a radius and a phase information associated with each symbol of said modulated transmitted signal point position signal and outputs a radius number and a phase number of said plurality of signal points in order of position of symbols of said modulated transmitted signal point position signal synchronously with said received signal.

5. A signal receiving apparatus comprising:
a radius identifying section configured to identify a radius representing distance of each signal point of a plurality of signal points from origin of a corresponding IQ plane, wherein each signal point corresponds to a symbol obtained from a received signal modulated by amplitude phase shift keying modulation scheme;
a parameter outputting section configured to output a control parameter related to a demodulation process of said received signal on the basis of said identified radius;
a phase-component offset section configured to execute offset processing on phase component of each of said plurality of signal points of said received signal; and
an averaging section configured to compute averages of I and Q components of signal points having a common identified radius and have phase components already subjected to said offset processing, wherein
said parameter outputting section generates reference signal point position information, wherein said reference signal point position information is generated based on said averaging, and wherein said reference signal point position information is output as said control parameter.

6. A signal receiving apparatus comprising:
a radius identifying section configured to identify a radius representing distance of each signal point of a plurality of signal points from origin of a corresponding IQ plane, wherein each signal point corresponds to a symbol obtained from a received signal modulated by amplitude phase shift keying modulation scheme; and
a parameter outputting section configured to output a control parameter related to a decoding process of said received signal on the basis of said identified radius,
wherein said radius identifying section identifies said radius by outputting information representing said radius of said signal point of a zone comprising a modulated known symbol in a frame composing said received signal,
wherein said received signal is a broadcast signal of advanced broadband satellite digital broadcasting and said zone comprising a modulated known symbol is a zone comprising a modulated transmitted signal point position signal,
wherein said signal receiving apparatus further comprises:
a phase-component offset section configured to execute offset processing on phase component of each of said plurality of signal points of said received signal; and
an averaging section configured to compute averages of I and Q components of signal points having a common identified radius and have phase components already subjected to said offset processing, wherein said parameter outputting section generates reference signal point position information, wherein said reference signal point position information is generated based on said averaging, and wherein said reference signal point position information is output as said control parameter.

7. The signal receiving apparatus according to claim 6, wherein said radius identifying section pre-stores a radius and a phase information associated with each symbol of said modulated transmitted signal point position signal and outputs a radius number and a phase number of said plurality of signal points in order of position of symbols of said modulated transmitted signal point position signal synchronously with said received signal.

8. A signal receiving method comprising:
identifying a radius representing distance of each signal point of a plurality of signal points from origin of a corresponding IQ plane, wherein each signal point corresponds to a symbol obtained from a received signal modulated by amplitude phase shift keying modulation scheme; and
outputting a control parameter related to a demodulation process of said received signal on the basis of said identified radius,
wherein a reference signal point position information is used as a reference in determination of said symbol of said received signal and likelihood computation by restoring a phase component already subjected to an offset processing to its original value.

9. A signal receiving method comprising:
identifying a radius representing distance of each signal point of a plurality of signal points from origin of a corresponding IQ plane, wherein each signal point corresponds to a symbol obtained from a received signal modulated by amplitude phase shift keying modulation scheme;
outputting a control parameter related to a decoding process of said received signal on the basis of said identified radius,
executing offset processing on phase component of each of said plurality of signal points of said received signal; and
computing averages of I and Q components of signal points having a common identified radius and have phase components already subjected to said offset processing, wherein
reference signal point position information is generated based on said averaging, and wherein said reference signal point position information is output as said control parameter.

10. A non-transitory computer readable storage medium having stored thereon, a computer program having at least one code section executable by a computer, thereby causing the computer to perform the steps comprising:
identifying a radius representing distance of each signal point of a plurality of signal points from origin of a corresponding IQ plane, wherein each signal point corresponds to a symbol obtained from a received signal modulated by amplitude phase shift keying modulation scheme; and outputting a control parameter related to a demodulation process of said received signal on the basis of said identified radius, wherein a reference signal point position information is used as a reference in determination of said symbol of said received signal and likelihood computation by restoring a phase component already subjected to an offset processing to its original value.

11. A non-transitory computer readable storage medium having stored thereon, a computer program having at least one code section executable by a computer, thereby causing the computer to perform the steps comprising:

identifying a radius representing distance of each signal point of a plurality of signal points from origin of a corresponding IQ plane, wherein each signal point corresponds to a symbol obtained from a received signal modulated by amplitude phase shift keying modulation scheme;

outputting a control parameter related to a decoding process of said received signal on the basis of said identified radius;

executing offset processing on phase component of each of said plurality of signal points of said received signal; and computing averages of I and Q components of signal points having a common identified radius and have phase components already subjected to said offset processing, wherein reference signal point position information is generated based on said averaging, and wherein said reference signal point position information is output as said control parameter.

* * * * *